United States Patent Office 3,280,642
Patented Oct. 25, 1966

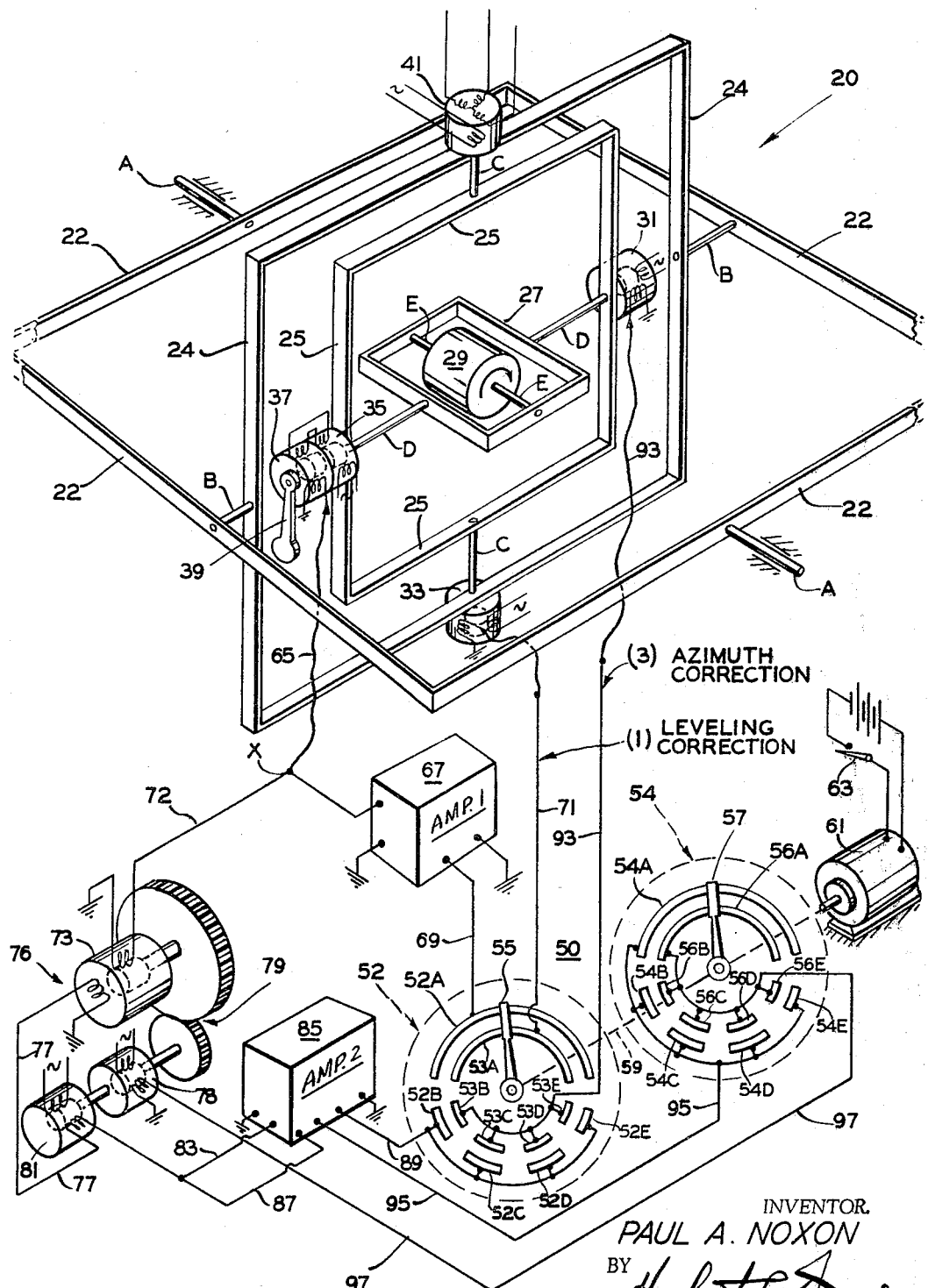

3,280,642
DIRECTIONAL GYROSCOPE
Paul A. Noxon, Tenafly, N.J., assignor to The Bendix Corporation, Teterboro, N.J., a corporation of Delaware
Filed Sept. 28, 1962, Ser. No. 226,829
4 Claims. (Cl. 74—5.4)

The invention relates to improvements in a directional gyroscope applicable to vehicles which have a quiescent period e.g. land tanks, or perhaps aircraft.

An object of the invention is to use the quiescent period for orienting the gyroscope which functions as a conventional gyroscope during the mission, here assumed to be short enough to make this feasible.

Accordingly, an object of the invention is to provide a directional gyroscope equipped with oscillating pitch bearings and having an external gimbal system which may be supplied as part of a two-gyroscope platform of conventional type.

Another object of the invention is to provide means of effecting angular measurement between the pitch axis and vertical axis of the gyroscope so the the vertical axis may be normally stabilized, as in a two-gyroscope platform.

Another object of the invention is to provide external to the gyroscope arrangement a suitable timed switching device such as a pair of commutators capable of continuous rotation at a suitable speed (for example, 1 revolution in 10 minutes) and being stopped for an indefinite period in a predetermined position such as shown in the drawing and through which operation there may be effected three distinct modes of operation including (1) synchronization and leveling of the gyroscope, (2) normal directional operation of the gyroscope and (3) incremental adjustment of the azimuth indication of the directional gyroscope.

Another object of the invention is to provide a directional gyroscope utilizing a timed switching device to selectively effect the three modes of operation including (1) synchronization and leveling of the gyroscope; (2) directional operation of the gyroscope; and (3) incremental correction in the azimuth indication of the directional gyroscope.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

In the drawing:
The drawing is a schematic illustration of the invention.

Referring to the drawing, there is indicated by the numeral 20 a directional gyroscopic arrangement of conventional type and which may include an external gimbal system having a horizontal gimbal 22 rotatably mounted about an axis A—A, and a second vertical gimbal 24 pivotally mounted on the gimbal 22 by axis B—B. The external gimbal system may be supplied as part of a two gyro platform also of conventional type, and there may be pivotally mounted within the gimbal 24 about vertical axis C—C a vertical gimbal 25.

There is further pivotally mounted within the vertical gimbal 25 an inner gimbal 27 pivotally mounted about a pitch axis D—D. Within the gimbal 27, there is rotatably mounted about axis E—E, a gyroscopic rotor element 29 driven by suitable motor means not shown.

A torquer motor 31 is mounted on the vertical gimbal 25 and so arranged as to apply a controlled torque about the pitch axis D—D so as to cause the gyroscope to precess about vertical axis C—C. There is further mounted on the gimbal 24 a second torquer motor 33 arranged to apply a controlled torque about the vertical axis C—C so as to cause the gyroscope to precess about the pitch axis D—D.

There is further provided a synchro 35 carried by the vertical gimbal 25 and arranged to sense angular adjustment of the gimbal 27 about the pitch axis D—D, while mounted on the vertical gimbal 25 is a separate differential synchro 37 operated by a pendulum 39 upon adjustment of the position of the inner gimbal 27 about the pitch axis D—D. A second synchro 41 is mounted on the vertical gimbal 24 and so arranged as to sense the adjusted position of the vertical axis C—C to effect transmission of external data signals.

The structure of the directional gyroscope arrangement 20 including torquer motors 31 and 33 as well as the arrangement of the synchros 41 and 35 may be of conventional type and form part of a directional gyroscope system in which a synchro 35 provides a means for effecting a measurement of the angular adjustment of the inner gimbal 27 about the pitch axis D—D relative to the vertical gimbal 25 while the torquer motor 31 serves to apply a torque about the pitch axis D—D to cause the gyroscope to precess about the vertical or azimuth axis C—C. Furthermore, the torquer motor 33 serves to apply a torque about the vertical axis C—C to cause the gyroscope to precess about the pitch axis D—D to effect a leveling action on the gyroscope, as explained in further detail hereinafter.

Gyroscope control mechanism

External of the gyroscopic mechanism 20, there is provided a novel switch device 50, shown in the drawing as including a pair of commutators 52 and 54. The commutator 52 has outer segmental switch elements 52A, 52B, 52C, 52D, and 52E arranged in spaced relation as well as corresponding inner spaced segmental switch elements 53A, 53B, 53C, 53D, and 53E with which a rotatable switch arm 55 is arranged to selectively cooperate, as shown in the drawing.

Similarly, the commutator 54 includes outer segmental switch elements 54A, 54B, 54C, 54D, and 54E, arranged in spaced relation as well as inner spaced segmental switch contacts 56A, 56B, 56C, 56D, and 56E. A rotatable switch arm 57 is arranged to cooperatively engage corresponding segmental switch contacts, as shown in the drawing.

The switch arms 55 and 57 are driven in timed relation through a shaft 59 by a suitable constant speed electric motor 61 operatively controlled by a switch 63. The commutator switch arms 55 and 57 are arranged for continuous rotation at a suitable speed (say, one revolution in 10 minutes) and may be stopped for an indefinite period in the position shown by the opening of the operator-operative control switch 63.

As shown by the drawing, the synchro 35 sensitive to the adjustment of the gyroscope about the pitch axis D—D is serially connected to the differential synchro 37 controlled by the pendulum 39. The synchro 37 has an output connected through a conductor 65 to the input of the amplifier 67. Further connected to the input conductor 65 at X is a conductor 72 leading to the input of a synchro 73 of an integrating mechanism 76. The synchro 73 is so arranged as to apply a signal in opposition to the signals from the synchros 35 and 37 to null the same in an output line 77.

The amplifier 67 in turn has an output line 69 connected to the segmental contact element 52A of the commutator 52. In the position shown, the switch arm 55 serves to operatively connect the segmental contact element 52A to the corresponding inner segmental switch contact 53A which is in turn connected through a conductor 71 to the control winding of the torquer motor 33 which is arranged to apply a torque about the vertical axis C—C so as to cause the gyroscope to precess about the pitch axis D—D under the controlling action of the synchros 35 and 37 for leveling the gyroscope by excitation of the torquer motor 33 in response to an error signal applied at a point X in input line 65 so that it sees null independently of the synchro 73 having an input connected through a conductor 72 to the point X, as heretofore explained.

An integrating mechanism comprises the synchro 73, a motor 78 to position a rotor element of the synchro 73 through a gearing 79 to apply a signal through the line 77 to an input 83 of the amplifier 85. The motor 78 also drives a rate generator 81 so as to apply an antihunting signal to the input line 83 of the amplifier 85. The amplifier 85 is further stabilized by an inverse feedback 87 of a conventional type.

The amplifier 85 may have two outputs, one 89 for controlling the motor 31 and the other 95 for controlling the excitation of the torquer motor 78, as hereinafter described.

The output line 89, as shown in the drawing, is connected to the segmental switch contact elements 52B, 52C, 52D, and 52E arranged in a cooperative arrangement with the inner segmental contacts 53B, 53C, 53D, and 53E to be selectively closed by the operation of the rotary switch arm 55.

The output line 95 is in turn connected to the segmental switch contact elements 54A, 54B, 54C, 54D and 54E arranged in cooperative relation with inner segmental contact elements 56A, 56B, 56C, 56D, and 56E.

The inner segmental switch contact elements 53B, 53C, 53D, and 53E of commutator 52 are in turn connected by a conductor 93 to the control winding of the torquer motor 31.

On the other hand, the inner segmental switch contacts 56A, 56B, 56C, 56D and 56E are connected by conductor 97 to the control winding of the motor 78.

The switching device 50 driven by the timer motor 61 is so arranged as to effect three modes of operation of the gyroscopic mechanism 20: (1) synchronization and leveling of the gyroscope; (2) normal directional operation of the gyroscope; and (3) azimuth correction of the gyroscope about the vertical axis C—C. The mode of operation (2) of the gyroscope in the normal directional operation thereof is that in which the device is used for an active mission. The modes of operation (1) and (3) are selectively effected under the control of the timing mechanism which will now be described.

*Synchronization and leveling*

During the period in which the switch arm 55 is traversing the segmental switch contacts 52A–53A and the switch arm 57 is traversing the segmental switch contacts 54A–56A, it will be seen that the amplifier 67 is in effect operatively connected to the torquer motor 33, and since there is fed thereby to the control winding of the torquer motor 33 a signal which is proportional to the angle that the gyro axis D—D makes with the horizontal, there is effected a precession of the gyroscope (in response to the action of the torquer motor 33) about axis D—D and such precession occurs in a sense to reduce the angular position thereof from the level position as sensed by the synchro 35. If the switch arms 55 and 57 dwell long enough on the respective segmental switch contacts 52A–53A and 54A–56A, the gyroscope will be completely level.

At the same time, it will be seen that amplifier 85 has its output connected to the control winding of the motor 78 and receives an input signal from the synchro 73 representing the sum of the angular error signals transmitted by the synchros 35 and 37 (the gyro error in level) and is thereby driven to a null with respect to this position.

As the integrator action is somewhat faster than the gyro leveling action, it will become synchronized to a null representing the gyro attitude relative to the horizontal. As heretofore explained, this will indeed be level if the dwell on the segmental switch contacts, as beforementioned, is long enough.

*Directional operation*

This mode of operation is initiated by the switch arms 55 and 57 leaving the segmental switch contacts 52A–53A and 54A–56A, whereupon the circuits controlled thereby are now open and neither the torquer 33 nor the motor 78 is excited. The gyroscope is now free to act as a space reference. If the spin axis E—E of rotor 29 under this condition has some angle with the meridian, a component of the earth's rotation (proportional to the sine of this angle $\times$ cos latitude) will appear about the pitch axis D—D in a manner well known in the art.

After some time has elapsed, the switch arms 55 and 57 will reach the next succeeding switch segmental contacts 52B–53B, 54B–56B and there may have been accumulated during this elapse of time an angle error between synchros 35 and 37 and synchro 73 due to this rotation inasmuch as the synchro 73 is initially synchronized to the corresponding initial position of synchros 35 and 37.

This angle error, of course, appeared as an error signal at the input of the amplifier 85 whereup there is applied an output signal through the respective output lines 89 and 95. Closure of the output circuit 89 and 95 by the switch arm 55 and by leveling switch contacts 52A–53A, 54A–56A and switch contacts 52B–53B, 54B–56B accomplishes two things: (1) the output signal applied to the line 89 of amplifier 85 is fed to the control winding of the torquer motor 31 causing the gyroscope mechanism 20 to precess about the axis C—C (azimuth) at a rate proportional to the amplifier output, and hence the error signal existing at the synchro 73; and (2) the output applied to the output line 95 of the amplifier 85 is connected to the control winding of the motor 78 which proceeds to drive through the gearing 79 the synchro 73 to a null position. The time required for this operation depends on the constants of the rate generator 81 driven by the motor 78 and the amplifier 85 as well as the ratio of the gearing 79 which may be designed so as to be in the order of several seconds.

In the latter operation, eventually the synchro 73 will reach a null position whereupon the amplifier 85 will have no output, but during the time the motor 78 is driving the synchro 73, the gyroscope will have been precessing about axis C—C and will wind up having made an incremental correction in azimuth. The switch arms 55 and 57 will eventually clear the segments 52B–53B restoring the freedom of the gyroscope 20 so that when segmental contacts 52C–53C and 54C–56C is reached, there will be effected another incremental of azimuth correction and through the next succeeding segmental contacts producing an increment of correction in the azimuth until the switch arms 55 and 57 eventually reach the segmental switch contacts 52A–53A and 54A–56A.

It must be borne in mind that while the torquer motor 31 may be correcting the azimuth error about the vertical axis C—C, the gyroscope may be departing from a level position about a pitch axis D—D so that upon switch arms 55 and 57 closing the segmental contacts 52A–53A and 54A–56A, the synchronization and leveling signal is repeated so as to eliminate this error.

It may be noted, however, that operation of the torquer motor 31 produces no azimuth precession (ideally) so that azimuth corrections are maintained. As the cycle is repeated of correction and leveling, the gyroscope eventually reaches a point of equilibrium; level, and with the spin axis E—E aligned along the meridian within the thresholds of the system.

There is provided a relationship between the gyroscope azimuth precessional rates and the time constants of the integrator. At a given latitude, it may be possible to completely correct the azimuth error in one cycle of correction. Since the gyroscope behavior depends on latitude, some correction for this may be necessary, as one can have a heavily overdamped response, a dead beat, underdamped or even instability over the possible range of values.

While several of the embodiments of the invention have been illustrated and described, various changes in the form and relative arrangements of the parts, which will now appear to those skilled in the art may be made without departing from the scope of the invention. Reference is therefore to be had to the appended claims for a definition of the limits of the invention.

What is claimed is:

1. In a directional gyroscope of a type including means to effectively level the gyroscope and other means to effect an azimuth adjustment of the gyroscope; the improvement comprising a timing device to effect first selective operation of the leveling means for a first predetermined period, second permit directional operation of the gyroscope for a second predetermined period, and third effect selective operation of the azimuth adjusting means for a third predetermined period, and other means sensitive to adjustment of the gyroscope to a level position to be varied during the first and third predetermined periods.

2. The combination defined by claim 1 in which the timing device includes a constant speed motor, first and second rotary switch arms driven by the motor, switch contacts selectively closed by the switch arms so as to effect selective operation of the leveling means and the azimuth adjusting means, and said switch arms being so positioned as to open said switch contacts so as to permit the adjustment of the directional operation of the gyroscope.

3. In a gyroscopic mechanism of a type including an outer gimbal pivotal about a first axis and an inner gimbal pivotally mounted about a second axis extending perpendicularly to the first axis, first means for applying a torque about the first axis to precess the gyro about the second axis, and second means to apply a torque about the second axis to precess the gyro about the first axis; the combination comprising a timing device to permit a quiescent period for selective operation of the first and second torquing means, and said timing device including means to permit normal operation of the gyroscope during periods of operation intermediate the selective operation of the first and second torquing means, and other means sensitive to the position of said timing device and to the adjustment of the gyroscope about one of said axis to vary the selective operation of the first and second torquing means during the quiescent period provided by said timing device.

4. For use with a directional gyroscope of a type including a gimbal pivotal about a pitch axis and another gimbal pivotal about a vertical axis, one of said gimbals being pivotally mounted within the other of said gimbals, first means for applying a torque about the pitch axis and second means for applying a torque about the vertical axis; the improvement comprising a timing device to effect selective operation of the first torquing means for a first predetermined period and selective operation of the second torquing means for a second predetermined period, and said timing device being effective to permit directional operation of the gyroscope for periods of time between the operation of the first and second torquing means.

References Cited by the Examiner

UNITED STATES PATENTS 2,868,024   1/1959   Meyer _____ 74—5

FRED C. MATTERN, Jr, *Primary Examiner.*

BROUGHTON G. DURHAM, *Examiner.*

K. DOOD, T. E. W. SHEAR, P. W. SULLIVAN,
*Assistant Examiners.*